United States Patent
Jeon et al.

(10) Patent No.: US 9,961,646 B2
(45) Date of Patent: May 1, 2018

(54) DEVICES AND METHOD USING TRANSMIT POWER CONTROL AND SCHEDULING FOR LTE UNLICENSED BAND OPERATION

(71) Applicant: Intel IP Corporation, Santa Clara, CA (US)

(72) Inventors: Jeongho Jeon, San Jose, CA (US);
Huaning Niu, Milpitas, CA (US);
Seunghee Han, San Jose, CA (US);
Hwan-Joon Kwon, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days. days.

(21) Appl. No.: 15/327,167

(22) PCT Filed: Aug. 21, 2015

(86) PCT No.: PCT/US2015/046323
§ 371 (c)(1),
(2) Date: Jan. 18, 2017

(87) PCT Pub. No.: WO2016/029132
PCT Pub. Date: Feb. 25, 2016

(65) Prior Publication Data

US 2017/0164301 A1    Jun. 8, 2017

Related U.S. Application Data (60) Provisional application No. 62/040,319, filed on Aug. 21, 2014.

(51) Int. Cl.
*H04W 16/14* (2009.01)
*H04W 52/24* (2009.01)
(Continued)

(52) U.S. Cl.
CPC ....... *H04W 52/243* (2013.01); *H04W 52/143* (2013.01); *H04W 52/283* (2013.01);
(Continued)

(58) Field of Classification Search
CPC . H04W 16/14; H04W 52/243; H04W 52/283; H04W 52/265; H04W 52/04;
(Continued)

(56) References Cited

U.S. PATENT DOCUMENTS

2008/0171565 A1    7/2008   Shan et al.
2009/0201861 A1*   8/2009   Kotecha ................ H04L 1/0027
                                                          370/329
(Continued)

FOREIGN PATENT DOCUMENTS

WO    WO-2014123356 A1    8/2014

OTHER PUBLICATIONS

"International Application Serial No. PCT/US2015/046323, InternationalSearch Report dated Dec. 1, 2015", 3 pgs.
(Continued)

*Primary Examiner* — Keith Ferguson
(74) *Attorney, Agent, or Firm* — Schwegman Lundberg & Woessner, P.A.

(57) ABSTRACT

An enhanced NodeB (eNB), user equipment (UE) and communication methods therebetween using an unlicensed channel of an unlicensed band are generally described. The eNB measures an interference power level (IPL) of the unlicensed channel at the eNB and determine a transmit power level (TPL) for a downlink transmission based on the IPL, the TPL decreasing with increasing IPL. Feedback including unlicensed channel conditions measured by the UE is used by the eNB to determine the UE-eNB proximity. The eNB determines whether to transmit the downlink transmission to the UE based on the IPL and the proximity;
(Continued)

as the IPL increases, the eNB services increasingly proximate UEs until, when the IPL exceeds a predetermined threshold, the eNB does not service any UE using the unlicensed channel. The eNB schedules and transmits the downlink transmission to the UE using the transmit power level.

26 Claims, 4 Drawing Sheets

(51) Int. Cl.
    *H04W 52/14* (2009.01)
    *H04W 72/12* (2009.01)
    *H04W 52/28* (2009.01)
    *H04W 72/04* (2009.01)
    *H04W 84/12* (2009.01)

(52) U.S. Cl.
    CPC ..... *H04W 72/048* (2013.01); *H04W 72/0473* (2013.01); *H04W 72/1231* (2013.01); *H04W 84/12* (2013.01)

(58) Field of Classification Search
    CPC . H04W 72/082; H04W 72/085; H04W 24/10; H04W 52/143; H04W 52/241; H04W 72/1231; H04W 52/18; H04W 8/245
    USPC ... 455/522, 69, 509, 450, 501, 67.11, 452.2, 455/127.1–127.3, 550.1, 423–425, 434, 455/454, 515, 561, 561.1, 456.1–457, 455/422.1, 403, 426.1, 426.2; 370/328, 370/329, 338, 252
    See application file for complete search history.

(56) References Cited

U.S. PATENT DOCUMENTS

| | | |
|---|---|---|
| 2013/0188552 A1 | 7/2013 | Kazmi et al. |
| 2013/0343288 A1 | 12/2013 | Ratasuk et al. |
| 2014/0031028 A1 | 1/2014 | Yamada et al. |
| 2014/0044105 A1* | 2/2014 | Bontu .............. H04L 5/001 370/336 |
| 2015/0163680 A1* | 6/2015 | Valliappan ........... H04W 16/14 370/329 |

OTHER PUBLICATIONS

"International Application Serial No. PCT/US2015/046323, Written Opinion dated Dec. 1, 2015", 5 pgs.
Alcatel-Lucent, "Review of Regulatory Requirements for Unlicensed Spectrum", RP-140808, 3GPP TSG-RAN #64, Sophia-Antipolis, France, (Jun. 3, 2014).
QUALCOMM, "Introducing LTE in Unlicensed Spectrum", RP-131635, 3GPP RAN #62, Busan, South Korea, (Nov. 26, 2013), pp. 2-5.
"European Application Serial No. 15834206.3, Extended European Search Report dated Jan. 23, 2018", 12 pgs.
NTT Docomo, et al., "Minimum Transmission Bandwidth for Shared Data Channel in SC-Based E-UTRA Uplink", 3GPP Draft; R1-061784 UI Transmission Bandwidth for Shared Data Channel, 3rd Generation Partnership Project (3GPP), Mobile Competence Centre, 650, Route Des Luciales, (Jun. 20, 2006).

* cited by examiner

DEVICES AND METHOD USING TRANSMIT POWER CONTROL AND SCHEDULING FOR LTE UNLICENSED BAND OPERATION

PRIORITY CLAIM

This application is a U.S. National Stage Filing under 35 U.S.C. 371 from International Application No. PCT/US2015/046323, filed Aug. 21, 2015 and published in English as WO 2016/029132 on Feb. 25, 2016, which claims the benefit of priority to United States Provisional Patent Application Ser. No. 62/040,319, filed Aug. 21, 2014, and entitled "TRANSMIT POWER CONTROL AND SCHEDULING FOR LTE IN UNLICENSED BANDS," each of which is incorporated herein by reference in its entirety.

TECHNICAL FIELD

Embodiments pertain to radio access networks. Some embodiments relate to Long Term Evolution (LTE) transmissions in unlicensed bands.

BACKGROUND

Long Term Evolution (LTE) networks operate in a number of specific frequency bands and deliver a wide variety of information to an ever-increasing number and type of user equipment (UE). Typically, the use of different communication techniques is limited to licensed bands regulated by the federal government. However, the growth of data use is outstripping the availability of bandwidth in the LTE spectrum and consequently has led to a desire to expand LTE use by UEs and evolved node Bs (eNBs) beyond the licensed bands. This may result in additional complexity when LTE devices use unlicensed bands (LTE-Unlicensed (LTE-U) operation) as, while only LTE systems are able to legally operate in LTE bands and thus timing and scheduling of communications may be tightly controlled, LTE systems are to coexist with other systems in the unlicensed spectrum. In particular, LTE systems may wish to make use of the 5 GHz Unlicensed National Information Infrastructure (U-NII) bands, in which Wireless Local Area Network (WLAN) systems using IEEE 802.11a/n/ac technologies have enjoyed widespread use by both individuals and operators for a variety of purposes.

Due to coexistence of multiple types of communications and devices in the unlicensed band (e.g., LTE-U/LTE-U UEs and WLAN-based communications/WLAN stations (STAs)), interference between the disparate systems may be introduced. It may thus be desirable to provide enhanced control of transmitter power and scheduling of LTE-U communications to minimize the interference on WLAN transmissions caused by LTE-U transmissions.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
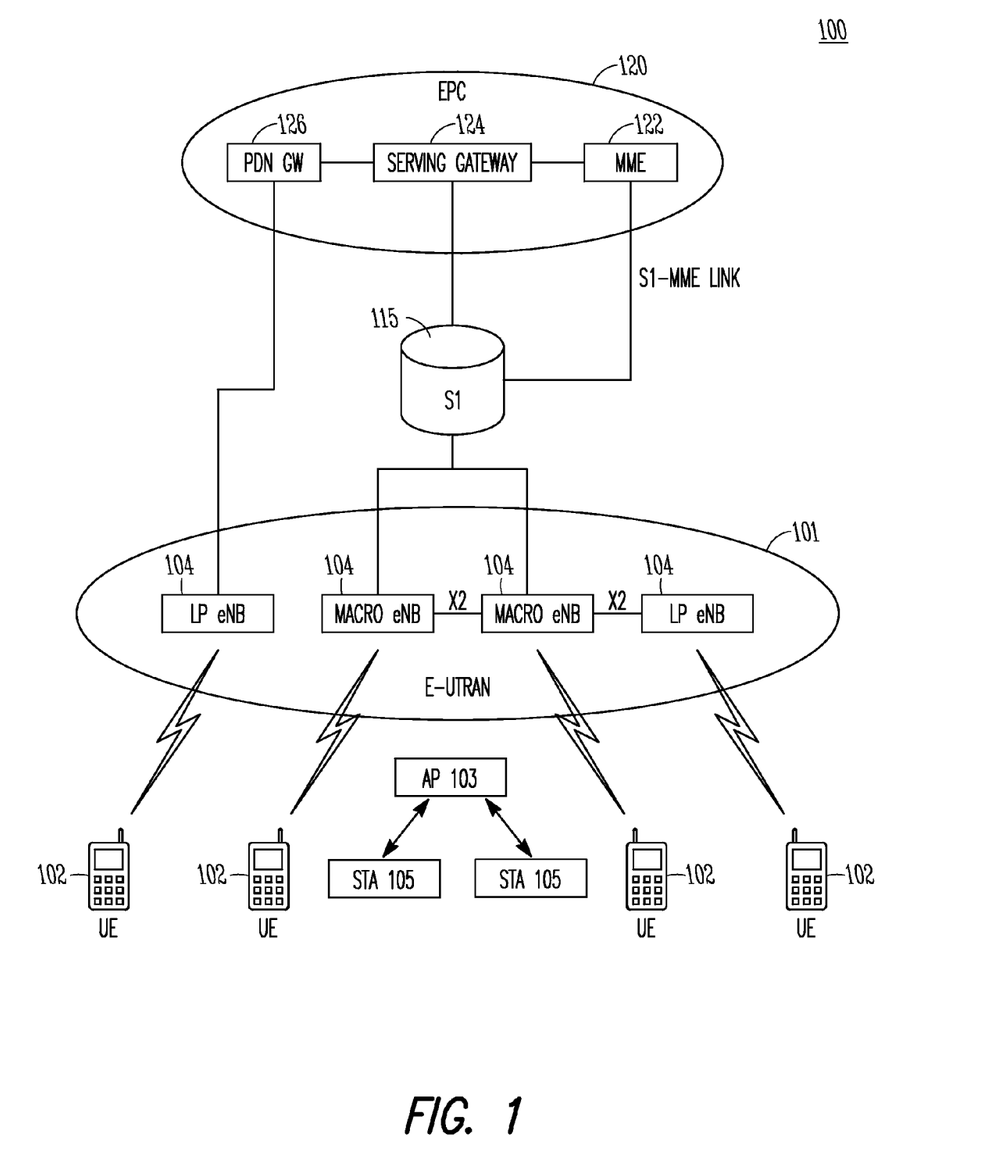
FIG. 1 shows an example of a portion of an end-to-end network architecture of an LTE network with various components of the network in accordance with some embodiments.

FIG. 1 shows an example of a portion of an end-to-end network architecture of a Long-Term Evolution (LTE) network with various components of the network in accordance with some embodiments. The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 may include mobility management entity (MME) 122, serving gateway (serving GW) 124, and packet data network gateway (PDN GW) 126. The RAN includes enhanced node Bs (eNBs) 104 (which may operate as base stations) for communicating with user equipment (UE) 102. The eNBs 104 may include macro eNBs and low power (LP) eNBs.

The MME 122 may be similar in function to the control plane of legacy Serving GPRS Support Nodes (SGSN). The MME may manage mobility aspects in access such as gateway selection and tracking area list management. The serving GW 124 may terminate the interface toward the RAN 101, and route data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may be a key node for policy enforcement and charging data collection. The PDN GW 126 may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) may terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate Orthogonal frequency-division multiplexing (OFDM) communication signals with an eNB 104 over a multicarrier communication channel in accordance with an OFDMA communication technique. The OFDM signals may comprise a plurality of orthogonal subcarriers.

The S1 interface 115 is the interface that separates the RAN 101 and the EPC 120. The S1 interface 115 may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be used to extend coverage to indoor areas where outdoor signals do not reach well, or to add network capacity in areas with very dense phone usage, such as train stations. As used herein, the term low power (LP) eNB may refer to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally connect to the user's broadband line. Once plugged in, the femtocell may connect to the mobile operator's mobile network and provide extra coverage in a range of typically 30 to 50 meters for residential femtocells. Thus, an LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Other wireless communication devices may be present in the same geographical region as the RAN 101. As shown in FIG. 1, WLAN devices including one or more access points (APs) 103 and one or more stations (STAs) 105 in communication with the AP 103. The WLAN devices may communicate using one or more IEEE 802.11 protocols, such as IEEE 802.11a/b/g/n/ac protocols. As the power of the WLAN devices 103, 105 may be fairly limited, compared with the eNBs 104, the WLAN devices 103, 105 may be geographically localized.

Communication over an LTE network may be split up into 10 ms frames, each of which contains ten 1 ms subframes. Each subframe, in turn, may contain two slots of 0.5 ms. Each slot may contain 6-7 symbols, depending on the system used. A resource block (RB) (also called physical resource block (PRB)) may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block. In Frequency Division Duplexed (FDD) mode, both the uplink and downlink frames may be 10 ms and may be frequency (full-duplex) or time (half-duplex) separated. In Time Division Duplexed (TDD), the uplink and downlink subframes may be transmitted on the same frequency and may be multiplexed in the time domain. A downlink resource grid may be used for downlink transmissions from an eNB to a UE. The grid may be a time-frequency grid, which is the physical resource in the downlink in each slot. Each column and each row of the resource grid may correspond to one OFDM symbol and one OFDM subcarrier, respectively. The duration of the resource grid in the time domain may correspond to one slot. The smallest time-frequency unit in a resource grid may be denoted as a resource element. Each resource grid may comprise a number of the above resource blocks, which describe the mapping of certain physical channels to resource elements. Each resource block may comprise 12 (subcarriers)*14 (symbols)=168 resource elements.

There may be several different physical downlink channels that are conveyed using such resource blocks. Two of these physical downlink channels may be the physical down link control channel (PDCCH) and the physical downlink shared channel (PDSCH). Each subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher-layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and may be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 2:
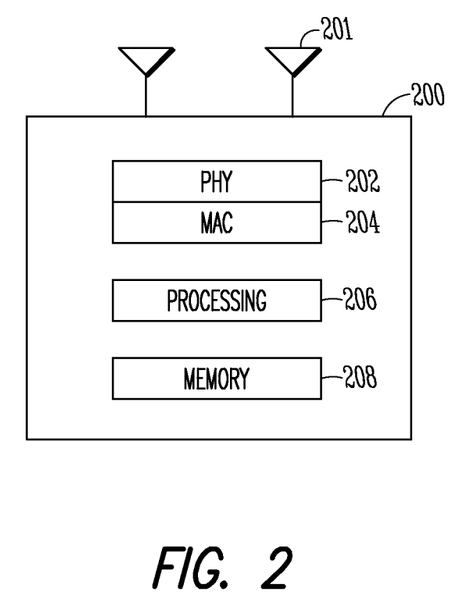
FIG. 2 illustrates a functional block diagram of a communication device in accordance with some embodiments.

FIG. 2 illustrates a functional block diagram of a communication device (e.g., an UE or eNB) in accordance with some embodiments. The communication device 200 may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations. In some embodiments, the processing circuitry 206 may include the PHY circuitry 202 and/or MAC circuitry 204. In some embodiments, processing circuitry 206 in an eNB may include a scheduler to schedule downlink transmissions to one or more UEs.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to $\frac{1}{10}$ of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a Long-Term Evolution (LTE) communication network or an LTE-Advanced communication network or a $4^{th}$ or $5^{th}$ generation (4G or 5G) LTE communication network or a high speed downlink/uplink access (HSDPA/HSUPA) communication network, although the scope of the invention is not limited in this respect.

As described above, as the demand for communicating data (e.g., voice and video) continues to increase, LTE networks may experience increasingly heavy communication traffic, leading to adverse network effects such as reduced data rates, increased delay and increased interference. To alleviate network traffic on the LTE licensed spectrum, one manner of increasing network capacity may be by providing communication capability using a communication spectrum not licensed for use by the cellular network devices (UEs and eNBs). With the increase in network usage, communication peaks may occur locally and the LTE network serving the location may experience peak demand at certain times of the day or week, or when special events such as sports events or concerts occur. As above, the location may also be serviced by a WLAN network, such as an IEEE 802.11 network including a WiFi network. However, because the WLAN network operates in an unlicensed band, availability and characteristics of the channels operating in the band may be an issue. UEs and eNBs that operate in the unlicensed band in addition to the licensed LTE band may be License Assisted Access (LAA) UEs and LAA eNBs, which are generally referred to herein merely as UEs and eNBs.

In LTE systems various types of measurements are typically performed to obtain operating conditions and used for downlink operation. For example, Channel State Information (CSI) measurements may be used to estimate the channel quality. CSI measurements may measure Cell-specific Reference Signals (CRS), CSI Reference Signals (CSI-RS) or other Channel State Information-Interference Measurement (CSI-IM) signals transmitted by the eNB for measurement purposes. From the measurements, calculations of the channel quality may be subsequently determined and reported to the eNB. The CSI report may include a Channel Quality Indicator (CQI) and may be sent from the UE to the eNB to indicate a suitable downlink transmission data rate, i.e., a Modulation and Coding Scheme (MCS) value, for communications with the UE. The information provided by the CQI may include both channel quality and desired transport block size. The CQI may be based on an observed signal-to-interference-plus-noise ratio (SINR) at the UE. The CQI may take into account the UE capability, such as the number of antennas and the type of receiver used for detection, which may be then used by the eNB to select an optimum MCS level for downlink scheduling and data transmission.

Unfortunately, while sensing and determination of channel conditions by UEs (and transmitted to the serving eNB) in the licensed band may be beneficial to the LTE network, determination of channel conditions in the unlicensed band and WLAN network may be more of an issue for LTE communications. For example, legacy Wi-Fi/Bluetooth devices may not communicate with devices that do not conform to WLAN standards. Thus, the eNB may not be able to obtain information directly from the WLAN devices. This means that the information available at the eNB may, in some circumstances, be somewhat limited. In particular, the unlicensed band interference level measured at the eNB and that measured at the distributed UEs served by the eNB may not be reciprocal due to the presence of WLAN devices. However, the measured interference level at the eNB may permit determination of the amount of interference induced by the eNB to the incumbent WLAN system operating on the same unlicensed band.

Control of the transmit power at the eNB, based on an estimation of the interference power level, may be used to protect the incumbent system. The measured interference level may thus, in some embodiments, be used to adjust the transmit power solely at the eNB to control its impact on the incumbent system. This estimation may be an approximation however, as the determined interference power level may be based on an aggregate amount of power emitted from transmission points rather than received at reception points. This may be somewhat mitigated by the fact that the unlicensed band radio access technologies, such as Wi-Fi and Bluetooth, are limited to short-range communications due to low device output power and also due to unlicensed band regulatory requirements, the transmission and reception points are usually in close proximity.

In other embodiments, in addition to or instead of adjusting the transmit power at the eNB, the measured interference level may be used to schedule transmissions of the UEs served by the eNB. In one particular embodiment, a channel-aware scheduling algorithm may be used to determine an appropriate schedule based on feedback on an instantaneous achievable rate at the UEs. The instantaneous achievable rate may depend on the channel quality between the eNB and UEs and the interference power level measured at the UEs. The UEs may be provided with a priority dependent on the instantaneous achievable rate, and the priority may be used in scheduling the downlink transmission. Therefore, particular UEs experiencing high interference from adjacent WLAN networks may be deprioritized in scheduling due to low instantaneous achievable rate. One example of the channel-aware scheduling algorithm may be a Proportional Fair Scheduler. UEs may be selected by the channel-aware scheduler at the eNB and served over the unlicensed band. In addition, due to limitations on transmission power imposed by governmental and standard body regulation in the unlicensed bands causing unmanageable interference environment, use of the unlicensed band by the eNB and UE may not be suitable for long distance transmission. In other words, the eNB may determine uplink and downlink transmission over unlicensed carrier based on proximity to the candidate UEs such that communications between the eNB and UEs greater than a threshold distance from the eNB use only the licensed band. As the eNB adjusts its transmit power, the range of UEs to be considered for scheduling may also change accordingly. The family of channel-aware scheduling algorithms may automatically adjust the range of candidate UEs based on the instantaneous achievable rate.

In some embodiments, cell breathing may also result in a more localized UE-eNB relationship. In cell breathing, as the loading on a cell increases and eventually becomes overloaded, the geographic size of the cell service area may be reduced. Subscriber traffic may be concomitantly offloaded to one or more neighboring cells, which increase in service area size to compensate for the reduction in service area reduction of the overloaded cell. This may result in load balancing as a portion of the communication traffic may be handed off from the overloaded cell to one or more neighboring cells. However, unlike cell breathing, which is strictly a function of traffic (and specifically traffic on the licensed band) and may be used in addition, the mechanism described herein may provide power control and scheduling across all UEs, which are remain served by the same eNB, determining which of the licensed and unlicensed band is to be used by the UEs. Moreover, power control may be performed specifically in response to the measured interference level over a specific unlicensed band. Furthermore, power control over different unlicensed band component carriers and channels may be able to be performed separately or jointly. The eNB may communicate with the UE using the same unlicensed channel or different unlicensed channels.

Figure 3:
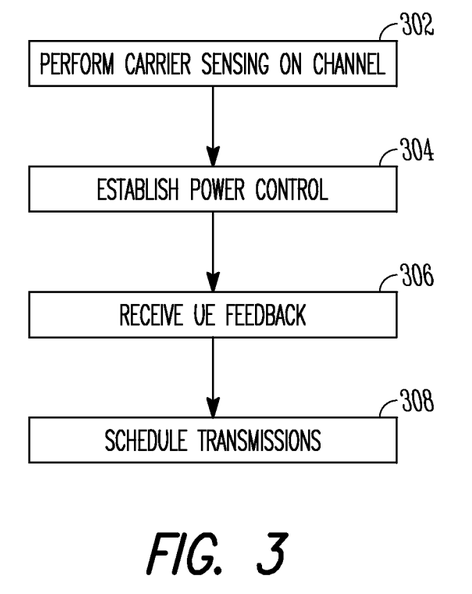
FIG. 3 illustrates a flowchart of a method of an LTE eNB operating over a scheduling round in accordance with some embodiments.

FIG. 3 illustrates a flowchart of a method of an LTE eNB operating over a scheduling round in accordance with some embodiments. In FIG. 3, at operation 302 the eNB may perform carrier sensing on one or more unlicensed channels in the unlicensed band currently in use and/or potentially to be used by the eNB or one of the UEs served by the eNB. The eNB may examine different available unlicensed channels for potential use a predetermined amount of time prior to potential use of the unlicensed channel. The carrier sensing may be performed over a predetermined amount of time prior to establishing power control. The eNB may perform the carrier sensing by either or both energy detection or signal preamble detection. The signal preamble detection may be used to detect valid WLAN OFDM waveforms.

In some embodiments, the eNB may measure the interference power level over a particular unlicensed channel. In some embodiments, when signal detection is used to determine the interference power level, the energy of the interference power level may be that only of a specific signal or may be the aggregate energy of all or a subset of all signals detected by the eNB. In some embodiments, if the eNB is able to distinguish individual signals from a superposition of multiple signals, the measured power level of the specific signal may be that of the strongest signal detected by the eNB. If the eNB has knowledge of the activity of neighboring eNBs, independent of the operator of the neighboring eNBs, the eNB may subtract the detected energy from that of the neighboring eNBs.

The eNB may at operation 304 establish power control. That is, the eNB may determine the transmit power level to be used for a later downlink transmission on the unlicensed band to one or more of the UEs. The transmit power level may be dependent on the measured interference power level determined at operation 302. The transmit power control may exploit channel reciprocity. For example, if the interference power level measured over the unlicensed channel at operation 302 is relatively high, the eNB may infer that there is an ongoing transmission in close proximity. The eNB may then infer that a downlink transmission may have a large impact to the ongoing WLAN transmission in reverse based on the channel reciprocity. The eNB may, in response, adjust the downlink transmission power accordingly to limit the amount of interference caused to the WLAN devices.

The eNB may employ a linear or non-linear function to determine the transmit power. The measured interference level may be used as one of the inputs to the function. In one non-limiting example, if I is the measured interference power level, the transmit power of the eNB can be set, for example, as $P=\max(P_{max}-cI, 0)$, where $P_{max}$ is the maximum supported transmit power at the eNB and c is a positive constant. In another non-limiting example, the transmit power control can be set as $P=\min(P_{max}/cI, P_{max})$, where $P_{max}$ is the maximum supported transmit power at the eNB and c is a positive constant. In the above, the transmit power level can be set to zero if the measured interference power level exceeds a maximum interference power level threshold, leading to the UEs and eNB engaging essentially in a Listen-Before-Talk (LBT) scheme. The maximum interference power level threshold may be fixed or adjusted by the eNB based on, for example, the number and type of UEs local to the interference.

In some embodiments, the power control may be over only a single unlicensed channel. In some embodiments, the power control may be over a predetermined number of channels, for example when carrier aggregation is used. In a multi-carrier (aggregation) scenario, the total power transmitted by the eNB may be distributed over each of the carriers evenly or unevenly, thus being dependent on the particular carrier (or UE using the carrier). In some embodiments, the carriers in carrier aggregation may be spread over different bands including the licensed band and one or more different unlicensed bands.

In some embodiments, the different maximum powers ($P_{max}$) may be allocated to different ones of the unlicensed carriers used by the eNB for downlink transmissions. In some embodiments, the maximum power allocated by the eNB to each of the unlicensed carriers may be fixed and independent of external conditions such as channel usage and conditions. In some embodiments, the maximum power allocated by the eNB to each of the unlicensed carriers may be dynamically assigned. For example, the dynamic maximum power allocation for one or more of the carriers may be based on the number of carriers being used during downlink transmission as well as based on channel and/or UE-specific characteristics such as relative geographic distance from the eNB or WLAN STAs, interference level, and rate of speed. In some embodiments, the maximum power may be updated periodically by the eNB using the information described herein and obtained by the UE and/or the eNB.

At operation 306, the eNB may receive feedback from one or more of the UEs on the unlicensed channel. The eNB may request each UE to send, to the eNB, feedback related to the channel quality between the eNB and the corresponding UE. The feedback may include the Reference Symbols Received Power (RSRP), which measures the average received power over the resource elements that carry cell-specific reference signals within the desired bandwidth. The feedback from each UE may be used by the eNB to infer the proximity between the UE and the corresponding eNB, e.g., in proportion to the reported RSRP value. The feedback may be sent to eNB periodically or aperiodically.

In some embodiments, the reporting of the feedback may be triggered by a specific request from the eNB. In some embodiments, the reporting of the feedback may be automatic, such as when the UE determines that a change in the measured channel quality (e.g., the RSRP) from the immediately preceding measured channel quality exceeds a predetermined threshold. The threshold may be updated periodically via UE-specific signaling or a system information block transmitted by the eNB. The threshold may be dependent, for example, on the type of the measured quality being detected and/or the particular band or channel undergoing detection.

Figure 4:
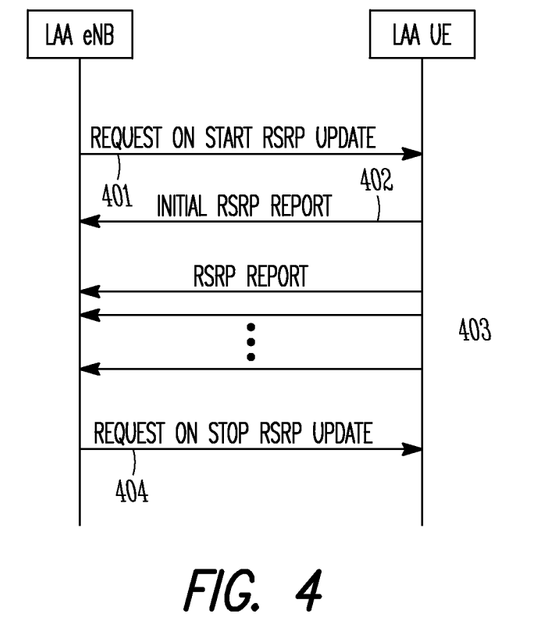
FIG. 4 illustrates an exemplary feedback mechanism in accordance with some embodiments.

FIG. 4 illustrates an exemplary feedback mechanism in accordance with some embodiments. At operation 401, the eNB may send a request message to a UE or a group of UEs to initiate the channel quality reporting, as shown RSRP reporting. The request message can be signaled to the UEs via, for example, L1/L2 (PDCCH), MAC CE, Radio Resource Control (RRC) signaling, or any other higher layer signaling. The request message may be transmitted to the UEs periodically or based on an event, such as a UE (or predetermined number of UEs) being handed off to or from the eNB. In the latter case, the eNB may retain a counter of the UE change, which may be incremented or decremented accordingly depending on the handover direction, to permit the eNB to adjust the power to one or more of the UEs, e.g., if a substantial change in the number or location of UEs occurs (which may also be in conjunction with a substantial change in interference level). The initial reporting, as above, may be periodic, aperiodic, or event-triggered.

The UE may at operation 402 transmit an initial RSRP value in a report. The eNB may expect the report within a predetermined amount of time. Thus, in circumstances in which the eNB does not receive the report from one or more of the UEs, the eNB may resend the request message. The eNB may resend the request message to all of the UEs or to only those UEs from which the eNB did not receive a report. The eNB may limit retransmission of the request message to a predetermined number of times before aggregating the resulting responses. The initial (RSRP) value reported can be a real value of the measurements or quantized value according to Table 9.1.4-1 in 3GPP Technical Specification 36.133.

At operation 403, one or more of the UEs may transmit an update to eNB. The eNB may indicate prior to or during the initial request at operation 401 which UEs are to provide updates. In some embodiments, all UEs may provide an update; in other embodiments, only a predetermined set of the UEs may provide an update (e.g., limiting the initial report and/or update to a set percentage of UEs within a predetermined distance from each other). Different UEs may provide updates at different rates, e.g., depending on their relative geographic distance from the eNB, interference level, rate of speed, and/or Quality of Service (QoS) among others. This update may be transmitted only when there is a change in the measured RSRP value. For example, the UE may transmit an update if the RSRP value deviates ΔdBm, either positive or negative, from its previous reporting. The UE can either send the new RSRP value or the difference from the previously reported value. As another example, the UE may transmit an update if the quantized RSRP value according to Table 9.1.4-1 in 3GPP TS 36.133 deviates K steps, either positive or negative, from its previous reporting. The UE can either send a new quantization level or only difference in terms of the quantization level from the previous reporting. The change may be dependent on the type of channel quality being sensed by the UE, relative geographic distance from the eNB, the richness of the multipath fading environment, or the speed of moving UEs, etc. . . . .

In some embodiments, the feedback may also include the interference power level measured at the UE. The reported feedback may be a reference signal received quality (RSRQ) and/or received signal strength indicator (RSSI) at the time when the measurement was performed. As above, the RSRQ reported can be a real value of the measurements or quantized value according to Table 9.1.7-1 in 3GPP TS 36.133. In some circumstances, the UE may be equipped with signal preamble detector. In this case, the signal preamble detector may detect valid WLAN OFDM waveforms, determine an interference level from the detected preambles and transmit the measured interference level and the basic service set identifier (BSSID) of a BSS including the WLAN device from which the preamble is measured.

Regardless of the information contained in the feedback, the feedback may be transmitted in an entirely separate message or may be sent along with another scheduled. In the latter case, the feedback may be transmitted in the PUCCH (or PDSCH) along with the Channel Quality Indication (CQI)/Channel State Information (CSI), Precoder Matrix Indication (PMI) and/or RI (Rank Indication) reporting.

At operation 404, the eNB may determine whether further updates of the feedback from one or more of the UEs are desired. In response to determining that further feedback updates from one or more of the UEs are no longer desired, the eNB may transmit a termination request to the one or more UEs from which at least the initial feedback has been received to terminate transmission of the feedback. In some embodiments, the eNB may transmit the termination request to all of the UEs at the same time. In some embodiments, the eNB may transmit the termination request to only a portion of the UEs dependent on, for example, the UE, physical environment (e.g., geographical location) of the UE and/or channel conditions; termination of the updates from the UEs may accordingly be staggered by the eNB. In some embodiments, rather than the eNB transmitting a termination request, the termination may be automatic; that is a predetermined number of updates may be sent by each UE that has received the request message, which again may be dependent on the UE, physical environment and/or channel conditions among others. In some embodiments, in addition to automatic termination the eNB may shorten the number of updates by transmitting the termination request. The eNB may use the feedback to infer the distance between the UE and the WLAN transmitters. In other embodiments, one or more of the UEs may determine its relative distance to the WLAN transmitters and provide this information as feedback to the eNB in addition to or instead of the above feedback, thereby offloading at least some of the distance calculations to the individual UEs. In embodiments in which device-to-device (D2D) communications are used and scheduled by the eNB, the feedback from multiple UEs may be collected by a particular UE and transmitted to the eNB, perhaps with the calculations being performed by the particular UE.

Turning back to FIG. 3, once the distance between the UE and the WLAN transmitters has been determined by the eNB, at operation 308, the eNB may schedule one or more of the UEs to be served in a subsequent downlink transmission. The UE selection may be based on the transmit power level determined in operation 304, the UE feedback obtained in operation 306, and other information, such as buffer status (the amount of information buffered at the eNB for a particular UE or the UEs in general). The eNB may schedule the downlink transmission such that the distance of the scheduled UEs is inversely proportional to the interference power level. Once scheduled, the eNB may transmit to the one or more of the UEs at the scheduled time using the transmit power level.

In some embodiments, the eNB may query the Enhanced Serving Mobile Location Center (E-SMLC)/Secure User Plane Location (SUPL) Location Platform (SLP) about the location information of the associated UEs. This information may be used as an additional input to the scheduler in the eNB to determine how close the individual UEs are to the eNB.

While the scheduling algorithm may be implementation dependent, generally the eNB may select UEs for downlink transmission from area whose range is inversely proportional to the measured WLAN interference power. Thus, the eNB may select a nearby UE or UEs when the measured WLAN interference power at the eNB is high such that the eNB has selected a relatively low transmit power level. Likewise, the eNB may select a relatively distant UE or UEs, i.e., cell-edge UE or UEs, when the measured WLAN interference is low such that the eNB has selected a relatively high transmit power level. The proximity of the UEs to the eNB may be inferred based on the RSRP feedback obtained at operation 306 or additional location information from location server, if available.

The eNB may also select a UE relatively distant from the WLAN STAs currently in transmission. The distance of the UE from the WLAN STAs may be inferred from the RSRQ or RSSI feedback received from the UEs during operation 306. In one embodiment, the eNB may confine the set of candidate UEs to be considered in the scheduling at operation 308 to those UEs whose channel quality can support a minimum MCS level at the determined transmit power level. This ensures that the eNB can confine its scheduling consideration to geographically appropriate UEs (relative to the eNB) dependent on the transmit power level. That is, the eNB may limit scheduling to those UEs proximate to the eNB when the eNB determines that a low transmit power level is to be used and open up scheduling to an increasingly larger number of UEs that are more distal to the eNB when a high power level is to be used. Although low and high transmit powers are referred to herein, in some embodiments the eNB may use distinct transmit power levels for downlink transmissions to the UEs and a distinct distance between the UE and the eNB associated with each power level. In other embodiments, the transmit power levels and associated distances may be continuous.

In some embodiments, the eNB may estimate an instantaneous achievable rate at the UEs instead of querying the E-SMLC/SLP about the UE location. The instantaneous achievable rate may be based on the feedback from the UEs indicating the channel quality between the eNB and the UE and the interference power level at the UE from the current WLAN transmissions. Estimation of the instantaneous achievable rate estimation may be performed using, for example, Shannon's capacity formula, its variants, or a reasonable mapping function. By selecting a UE having higher instantaneous achievable rate, the eNB may select one or more UEs relatively proximate to the eNB and relatively far from the source of WLAN interference for scheduling of downlink transmissions. Alternately, or in addition to the instantaneous achievable rate, the eNB may use signal-to-interference-plus-noise ratio (SINR) in scheduling downlink transmissions among the UEs.

The scheduling decision can be combined with additional metrics such as, for example, fairness. The eNB may include these metrics in normalizing the instantaneous achievable rates. The normalized instantaneous achievable rates may then be used by the eNB to determine normalization with respect to the average throughput of each UE for use in Proportional Fair scheduling (scheduling based on maintaining a balance between maximizing total throughput while allowing all users at least a minimal level of service).

In some embodiments, both the eNB and the UEs may be equipped with a signal preamble detector that can detect valid WLAN OFDM waveforms. In this case, the eNB and UEs may match the BSSID of the measured interference to confirm that the preamble measurements have been performed on the same target interference.

Accordingly, the eNB may, automatically or in response to a request, receive feedback from UE. The feedback may be associated with at least one of the RSRP or RSRQ. The eNB may detect an interference level on an unlicensed channel of an unlicensed band. The eNB may determine an appropriate transmit power level based on the detected interference level. The eNB may select one or more UEs to serve based on one or more of the feedback, an inferred proximity of each of the UEs to the WLAN STAs, the proximity of each of the UEs to the eNB and the transmit power level.

Similarly, the UE may receive from the serving eNB, a request for feedback. The UE may determine the feedback based on at least one of the RSRP or RSRQ. The UE may transmit an indication of the feedback to the eNB based on the request. The UE may automatically transmit one or more updates of the feedback to the eNB until a predetermined time or number of updates is reach or a termination request is received from the eNB.

As above, the eNB may schedule the downlink transmission based on the determined power level and the proximity information. This may permit adaptive scheduling by the eNB of concurrent transmission by LTE-U transmitters along with transmission by incumbent systems to maximize spatial resource reuse gain. In addition, the eNB may concurrently manage the level of interference to the incumbent system by control of the downlink transmit power. Thus, the eNB may decrease transmission power and/or limit the UEs served to proximate UEs (using either or both the licensed and unlicensed bands) when the measured interference level is high, and may increase transmission power and/or the geographical range of service to UEs when the measured interference level is reduced.

Various examples of the disclosure are provided below. These examples are not intended to in any way limit the disclosure herein. In Example 1, apparatus of an enhanced NodeB (eNB) comprises: a transceiver arranged to communicate with a user equipment (UE) over an unlicensed channel in an unlicensed band; and processing circuitry arranged to: measure an interference power level within the unlicensed channel; determine proximity of the UE to the eNB; determine a transmit power level for a downlink transmission using the unlicensed channel from the eNB to the UE based on the interference power level; schedule the downlink transmission to the UE dependent on the proximity; and configure the transceiver to transmit the downlink transmission to the UE using the transmit power level according to the schedule.

In Example 2, the subject matter of Example 1 can optionally include that the transmit power level is inversely proportional to the interference power level such that the transmit power level decreases with increasing interference power level and increases with decreasing interference power level.

In Example 3, the subject matter of one or any combination of Examples 1-2 can optionally include that the transmit power level is determined by $P=\max(P_{max}-cI, 0)$, where $P_{max}$ is a maximum supported transmit power, I is the interference power level and c is a positive constant, and the transmit power is determined by $P=\min(P_{max}/cI, P_{max})$.

In Example 4, the subject matter of one or any combination of Examples 1-3 can optionally include that different maximum supported transmit powers are allocated to different unlicensed carriers used by the eNB for downlink transmissions.

In Example 5, the subject matter of one or any combination of Examples 1-4 can optionally include that the transmit power is set to zero when the interference power level exceeds a maximum interference power level threshold.

In Example 6, the subject matter of one or any combination of Examples 1-5 can optionally include that the processing circuitry is further arranged to measure the interference power level from energy detection of the unlicensed channel.

In Example 7, the subject matter of one or any combination of Examples 1-6 can optionally include that the processing circuitry is further arranged to measure the interference power level from signal preamble detection of valid Wireless Local Area Network (WLAN) Orthogonal frequency-division multiplexing (OFDM) waveforms of the unlicensed channel.

In Example 8, the subject matter of one or any combination of Examples 1-7 can optionally include that the processing circuitry is further arranged to distinguish individual signals from a superposition of multiple signals, and the interference power level is the interference power level of a strongest signal of the unlicensed channel.

In Example 9, the subject matter of one or any combination of Examples 1-8 can optionally include that the interference power level is an aggregate energy of a subset of all signals detected by the eNB.

In Example 10, the subject matter of one or any combination of Examples 1-9 can optionally include that the transceiver is arranged to receive feedback from the UE on the unlicensed channel, and the processing circuitry is arranged to determine the proximity between the UE and eNB based on the feedback.

In Example 11, the subject matter of one or any combination of Examples 1-10 can optionally include that the transceiver is arranged to receive an update if the feedback deviates a predetermined amount from a previously received feedback.

In Example 12, the subject matter of one or any combination of Examples 1-11 can optionally include that a transceiver is arranged to communicate with a plurality of UEs over at least one unlicensed channel in the unlicensed band, for each UE, the processing circuitry is arranged to measure an interference power level of an unlicensed channel associated with the UE, determine a transmit power level for downlink transmissions from the eNB to the UE based on the interference power level associated with the UE, determine proximity between the UE and eNB based on feedback from the UE on the unlicensed channel, and schedule a downlink transmission to the UE using the transmit power level and dependent on the proximity.

In Example 13, the subject matter of one or any combination of Examples 1-12 can optionally include that the scheduling and transmission of downlink transmissions to the plurality of UEs employs a proportional relationship between interference power level and proximity to the eNB such that with increasing interference power level the downlink transmissions are limited to UEs with increasing proximity to the eNB.

In Example 14, the subject matter of one or any combination of Examples 1-13 can optionally include that the scheduling and transmission of downlink transmissions to the plurality of UEs is limited to UEs having a channel quality that supports a minimum Modulation and Coding Scheme (MCS) level at the transmit power level.

In Example 15, the subject matter of one or any combination of Examples 1-14 can optionally include that the processing circuitry is arranged to: estimate an instantaneous achievable rate at each of the UEs based on the feedback from the UE on channel quality between the eNB and the UE and the interference power level at the UE, and schedule downlink transmissions to the plurality of UEs dependent on the instantaneous achievable rate of the plurality of UEs.

In Example 16, the subject matter of one or any combination of Examples 1-15 can optionally include an antenna configured to transmit communications between the transceiver and the UE.

In Example 17, an apparatus of a user equipment (UE) comprises: a transceiver configured to communicate with an enhanced NodeB (eNB) using an unlicensed channel of an unlicensed band; and processing circuitry configured to: receive a request for feedback from the eNB; in response to the request, measure channel quality of the unlicensed channel and configure the transceiver to transmit the feedback indicating the channel quality to the UE; and configure the transceiver to receive, dependent on the feedback, a downlink transmission from the eNB, the downlink transmission having a transmit power level dependent on an interference power level within the unlicensed channel at the eNB.

In Example 18, the subject matter of Example 17 can optionally include that the feedback comprises information to determine a proximity of the UE to the eNB, and whether or not the UE receives the downlink transmission depends on the interference power level and proximity to the eNB such that receipt of the downlink transmission is increasingly likely with decreasing interference power level and decreasing proximity to the eNB.

In Example 19, the subject matter of one or any combination of Examples 17-18 can optionally include that the transmit power level is inversely proportional to the interference power level such that the transmit power level decreases with increasing interference power level and increases with decreasing interference power level.

In Example 20, the subject matter of one or any combination of Examples 17-19 can optionally include that the transceiver is arranged to transmit a feedback update if the measured channel quality deviates a predetermined amount from an immediately preceding measured channel quality.

In Example 21, the subject matter of one or any combination of Examples 17-20 can optionally include that the transceiver is arranged to continue to automatically transmit feedback updates unless a feedback termination request is received from the eNB.

In Example 22, the subject matter of one or any combination of Examples 17-21 can optionally include that the channel quality comprises at least one of a reference signal received power (RSRP) or a reference signal received quality (RSRQ).

In Example 23, a non-transitory computer-readable storage medium that stores instructions for execution by one or more processors of an enhanced NodeB (eNB) to configure the eNB to communicate via a transceiver with a user equipment (UE) using an unlicensed channel of an unlicensed band, the one or more processors to configure the eNB to: determine a transmit power level for a downlink transmission from the eNB to the UE based on an interference power level within the unlicensed channel at the eNB; determine proximity of the UE from the eNB using channel quality feedback received from the UE; determine whether or not to transmit the downlink transmission to the UE based on the interference power level and the proximity; and in response to determining to transmit the downlink transmission, transmit the downlink transmission to the UE using the transmit power level.

In Example 24, the subject matter of Example 23 can optionally include that the one or more processors configure the eNB to: receive at least one feedback update automatically from the UE, the at least one feedback update comprising a channel quality that deviates a predetermined amount from a channel quality of immediately preceding feedback received from the UE, determine whether or not continued feedback updates are desired from the UE, and in response to determining that continued feedback updates are no longer desired, transmit a feedback termination request to the UE.

In Example 25, the subject matter of one or any combination of Examples 23-25 can optionally include that the transmit power level is inversely proportional to the interference power level such that the transmit power level decreases with increasing interference power level and increases with decreasing interference power level.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of an enhanced NodeB (eNB) comprising:
   a transceiver arranged to communicate with a user equipment (UE) over an unlicensed channel in an unlicensed band; and
   processing circuitry arranged to:
   measure an interference power level within the unlicensed channel;
   determine proximity of the UE to the eNB;
   determine a transmit power level for a downlink transmission using the unlicensed channel from the eNB to the UE based on the interference power level;
   schedule the downlink transmission to the UE dependent on the proximity; and
   configure the transceiver to transmit the downlink transmission to the UE using the transmit power level according to the schedule.

2. The apparatus of claim 1, wherein:
   the transmit power level is inversely proportional to the interference power level such that the transmit power level decreases with increasing interference power level and increases with decreasing interference power level.

3. The apparatus of claim 2, wherein at least one of:
   the transmit power level is determined by $P=\max(P_{max}-cI, 0)$, where $P_{max}$ is a maximum supported transmit power, I is the interference power level and c is a positive constant, and
   the transmit power is determined by $P=\min(P_{max}/cI, P_{max})$, where $P_{max}$ is the maximum supported transmit power, I is the interference power level and c is a positive constant.

4. The apparatus of claim 3, wherein:
   different maximum supported transmit powers are allocated to different unlicensed carriers used by the eNB for downlink transmissions.

5. The apparatus of claim 2, wherein:
   the transmit power is set to zero when the interference power level exceeds a maximum interference power level threshold.

6. The apparatus of claim 1, wherein:
   the processing circuitry is further arranged to measure the interference power level from energy detection of the unlicensed channel.

7. The apparatus of claim 1, wherein:
   the processing circuitry is further arranged to measure the interference power level from signal preamble detection of valid Wireless Local Area Network (WLAN) Orthogonal frequency-division multiplexing (OFDM) waveforms of the unlicensed channel.

8. The apparatus of claim 1, wherein:
   the processing circuitry is further arranged to distinguish individual signals from a superposition of multiple signals, and the interference power level is the interference power level of a strongest signal of the unlicensed channel.

9. The apparatus of claim 1, wherein:
   the interference power level is an aggregate energy of a subset of all signals detected by the eNB.

10. The apparatus of claim 1, wherein:
    the transceiver is arranged to receive feedback from the UE on the unlicensed channel, and
    the processing circuitry is arranged to determine the proximity between the UE and eNB based on the feedback.

11. The apparatus of claim 10, wherein:
    the transceiver is arranged to receive an update if the feedback deviates a predetermined amount from a previously received feedback.

12. The apparatus of claim 1, wherein:
    the transceiver is arranged to communicate with a plurality of UEs over at least one unlicensed channel in the unlicensed band,
    for each UE, the processing circuitry is arranged to measure an interference power level of an unlicensed channel associated with the UE, determine a transmit power level for downlink transmissions from the eNB to the UE based on the interference power level associated with the UE, determine proximity between the UE and eNB based on feedback from the UE on the unlicensed channel, and schedule a downlink transmission to the UE using the transmit power level and dependent on the proximity.

13. The apparatus of claim 12, wherein:
    the scheduling and transmission of downlink transmissions to the plurality of UEs employs a proportional relationship between interference power level and proximity to the eNB such that with increasing interference power level the downlink transmissions are limited to UEs with increasing proximity to the eNB.

14. The apparatus of claim 12, wherein:
    the scheduling and transmission of downlink transmissions to the plurality of UEs is limited to UEs having a channel quality that supports a minimum Modulation and Coding Scheme (MCS) level at the transmit power level.

15. The apparatus of claim 12, wherein the processing circuitry is arranged to:
    estimate an instantaneous achievable rate at each of the UEs based on the feedback from the UE on channel quality between the eNB and the UE and the interference power level at the UE, and
    schedule downlink transmissions to the plurality of UEs dependent on the instantaneous achievable rate of the plurality of UEs.

16. The apparatus of claim 1, further comprising:
    an antenna configured to transmit communications between the transceiver and the UE.

17. An apparatus of a user equipment (UE) comprising:
    a transceiver configured to communicate with an enhanced NodeB (eNB) using an unlicensed channel of an unlicensed band; and
    processing circuitry configured to:
    configure the transceiver to receive a request for feedback from the eNB;
    in response to the request, measure channel quality of the unlicensed channel and configure the transceiver to transmit the feedback indicating the channel quality to the UE, the feedback further comprising information to permit the eNB to determine a proximity of the UE to the eNB; and configure the transceiver to receive, dependent on the feedback, a downlink transmission from the eNB, the downlink transmission having a transmit power level dependent on an interference power level within the unlicensed channel at the eNB, reception of the downlink transmission by the UE dependent on the interference power level and proximity to the eNB as indicated by the feedback.

18. The apparatus of claim 17, wherein:
the transmit power level is inversely proportional to the interference power level such that the transmit power level decreases with increasing interference power level and increases with decreasing interference power level.

19. The apparatus of claim 17, wherein:
the transceiver is arranged to transmit a feedback update if the measured channel quality deviates a predetermined amount from an immediately preceding measured channel quality.

20. The apparatus of claim 17, wherein:
the transceiver is arranged to continue to automatically transmit feedback updates unless a feedback termination request is received from the eNB.

21. The apparatus of claim 17, wherein:
the channel quality comprises at least one of a reference signal received power (RSRP) or a reference signal received quality (RSRQ).

22. A non-transitory computer-readable storage medium that stores instructions for execution by one or more processors of an enhanced NodeB (eNB) to configure the eNB to communicate via a transceiver with a user equipment (UE) using an unlicensed channel of an unlicensed band, the one or more processors to configure the eNB to:
determine a transmit power level for a downlink transmission from the eNB to the UE based on an interference power level at the eNB within the unlicensed channel;
determine proximity of the UE from the eNB using channel quality feedback received from the UE;
determine whether or not to transmit the downlink transmission to the UE based on the interference power level and the proximity; and
in response to determining to transmit the downlink transmission, transmit the downlink transmission to the UE using the transmit power level.

23. The non-transitory computer-readable storage medium of claim 22, wherein the one or more processors configure the eNB to:
receive at least one feedback update automatically from the UE, the at least one feedback update comprising a channel quality that deviates a predetermined amount from a channel quality of immediately preceding feedback received from the UE,
determine whether or not continued feedback updates are desired from the UE, and
in response to determining that continued feedback updates are no longer desired, transmit a feedback termination request to the UE.

24. The non-transitory computer-readable storage medium of claim 22, wherein:
the transmit power level is inversely proportional to the interference power level such that the transmit power level decreases with increasing interference power level and increases with decreasing interference power level.

25. An apparatus of a user equipment (UE) comprising:
a transceiver configured to communicate with an enhanced NodeB (eNB) using an unlicensed channel of an unlicensed band; and
processing circuitry configured to:
receive a request for feedback from the eNB;
in response to the request, measure channel quality of the unlicensed channel and configure the transceiver to transmit the feedback indicating the channel quality to the UE; and
configure the transceiver to receive, dependent on the feedback, a downlink transmission from the eNB, the downlink transmission having a transmit power level dependent on an interference power level within the unlicensed channel at the eNB,
wherein the transmit power level is inversely proportional to the interference power level such that the transmit power level decreases with increasing interference power level and increases with decreasing interference power level.

26. The apparatus of claim 25, wherein:
the transceiver is arranged to transmit a feedback update if the measured channel quality deviates a predetermined amount from an immediately preceding measured channel quality.

* * * * *